(12) United States Patent
Genshaft et al.

(10) Patent No.: US 12,239,138 B1
(45) Date of Patent: Mar. 4, 2025

(54) FOODSTUFF PROCESSING LINE SYSTEMS AND METHODS

(71) Applicant: Fresh Mark, Inc., Massillon, OH (US)

(72) Inventors: Isaac Genshaft, Massillon, OH (US); Anthony Lang, Massillon, OH (US); Dwight Jellison, Massillon, OH (US); Bill Yeager, Massillon, OH (US)

(73) Assignee: Fresh Mark, Inc., Massillon, OH (US)

( * ) Notice: Subject to any disclaimer, the term of this patent is extended or adjusted under 35 U.S.C. 154(b) by 0 days.

(21) Appl. No.: 18/462,256

(22) Filed: Sep. 6, 2023

(51) Int. Cl.
| | | |
|---|---|---|
| *A23B 4/28* | (2006.01) | |
| *A22C 9/00* | (2006.01) | |
| *A22C 17/00* | (2006.01) | |
| *A22C 18/00* | (2006.01) | |
| *A23B 4/052* | (2006.01) | |
| *A23B 4/06* | (2006.01) | |

(52) U.S. Cl.
CPC .............. *A22C 18/00* (2013.01); *A22C 9/001* (2013.01); *A22C 17/0006* (2013.01); *A22C 17/002* (2013.01); *A22C 17/0033* (2013.01); *A22C 17/0053* (2013.01); *A22C 17/008* (2013.01); *A22C 17/0093* (2013.01); *A23B 4/052* (2013.01); *A23B 4/062* (2013.01); *A23B 4/28* (2013.01)

(58) Field of Classification Search
CPC ................ A22C 18/00; A22C 17/0006; A22C 17/0053; A22C 17/0093; A22C 7/0023; A22C 9/001; A22C 9/007; A22C 17/002; A22C 17/0033; A22C 17/0073–0086; A22C 17/12; A22C 17/008; A23B 4/052; A23B 4/062; A23B 4/26–4/285
See application file for complete search history.

(56) References Cited

U.S. PATENT DOCUMENTS

| | | | | | |
|---|---|---|---|---|---|
| 3,157,213 | A | * | 11/1964 | Harris ................... | A22B 5/0029 83/165 |
| 3,175,592 | A | * | 3/1965 | Harris ................. | A22C 17/0006 452/30 |
| 3,436,230 | A | * | 4/1969 | Harrington ............ | A23B 4/285 99/535 |
| 5,071,666 | A | * | 12/1991 | Handel .............. | A22C 17/0053 99/533 |

(Continued)

FOREIGN PATENT DOCUMENTS

| | | |
|---|---|---|
| EP | 2084968 A1 | 8/2009 |
| WO | 2007112428 A1 | 10/2007 |

OTHER PUBLICATIONS

International Search Report and Written Opinion for Application No. PCT/US2024/045662 (062082-0580924) dated Dec. 16, 2024.

*Primary Examiner* — Drew E Becker
(74) *Attorney, Agent, or Firm* — Pillsbury Winthrop Shaw Pittman, LLP

(57) ABSTRACT

A process that includes receiving, by a trimmer via a conveyor system, a foodstuff, automatically trimming, by the trimmer and based on trimming instructions, the foodstuff that results in trimmings and a trimmed foodstuff. The process also includes advancing, via the conveyor system, the trimmings of the foodstuff to a trimmings collector, and advancing, via the conveyor system, the trimmed foodstuff out of the trimmer. The trimmer is provided on the conveyor system prior to an injector such that the trimmer performs the automatic trimming of the foodstuff prior to injecting the foodstuff with a liquid solution by the injector.

20 Claims, 7 Drawing Sheets

(56) References Cited

U.S. PATENT DOCUMENTS

| | | | | |
|---|---|---|---|---|
| 6,129,625 A * | 10/2000 | Cate | | A22C 17/0086 452/158 |
| 7,662,032 B1 * | 2/2010 | Gasbarro | | A22C 17/002 452/155 |
| 8,968,808 B1 * | 3/2015 | Kunert | | G01N 33/02 426/512 |
| 2003/0031767 A1 | 2/2003 | Leitinger | | |
| 2003/0224093 A1 * | 12/2003 | Kish | | A23B 4/02 426/478 |
| 2004/0096555 A1 * | 5/2004 | Gould | | A23L 13/03 426/281 |
| 2005/0034612 A1 * | 2/2005 | Corominas | | A22C 9/001 99/532 |
| 2005/0048893 A1 * | 3/2005 | Gasbarro | | A22C 17/002 452/155 |
| 2006/0157388 A1 * | 7/2006 | Blaine | | A22C 7/00 209/3.2 |
| 2006/0278101 A1 * | 12/2006 | Singh | | A22C 17/12 99/533 |
| 2009/0252832 A1 * | 10/2009 | Falk | | A22C 9/00 426/59 |
| 2010/0068357 A1 * | 3/2010 | Osborn | | A22C 15/00 99/535 |
| 2012/0115406 A1 * | 5/2012 | Fillenworth | | A22C 7/00 452/179 |
| 2015/0230483 A1 * | 8/2015 | Fritz | | A23L 13/00 426/243 |
| 2016/0213010 A1 * | 7/2016 | Petrovic | | A23P 30/10 |
| 2019/0191726 A1 * | 6/2019 | Lagares Gamero | | A22C 17/0053 |
| 2020/0068908 A1 * | 3/2020 | Blaine | | G06T 7/0006 |
| 2020/0315191 A1 * | 10/2020 | Hofmann | | A22C 7/0023 |
| 2020/0329744 A1 * | 10/2020 | Mills | | A23P 10/22 |
| 2021/0092968 A1 | 4/2021 | Blaine | | |
| 2021/0227840 A1 * | 7/2021 | Blaine | | B26D 5/007 |
| 2022/0007661 A1 * | 1/2022 | Bjarnason | | B26D 7/01 |
| 2023/0219249 A1 * | 7/2023 | Schäfer | | A22C 17/0033 83/29 |
| 2023/0248007 A1 * | 8/2023 | Hunt | | A23B 4/28 426/281 |

\* cited by examiner

FOODSTUFF PROCESSING LINE SYSTEMS AND METHODS

BACKGROUND

1. Field

The present disclosure relates generally to foodstuff processing and, more specifically, to a foodstuff processing line for processing meat.

2. Description of the Related Art

Bacon is a popular and beloved food item that is made from pork bellies. A pork belly is a cut of meat that is taken from the underside of a pig, and it is known for its rich, fatty flavor and tender texture. The process of making bacon from pork bellies involves several steps that are designed to preserve the meat, enhance its flavor, and create the distinctive texture and appearance that is associated with this food. In industrial meat processing processes and before the pork belly is sliced into bacon, the pork belly undergoes numerous processing steps from injecting the belly with pickling brine, smoking, chilling, trimming, and pressing the pork belly.

SUMMARY

The following is a non-exhaustive listing of some aspects of the present techniques. These and other aspects are described in the following disclosure.

Some aspects include a process that includes receiving, by a trimmer via a conveyor system, a foodstuff; automatically trimming, by the trimmer and based on trimming instructions, the foodstuff that results in trimmings and a trimmed foodstuff; advancing, via the conveyor system, the trimmings of the foodstuff to a trimmings collector; and advancing, via the conveyor system, the trimmed foodstuff out of the trimmer, wherein the trimmer is provided on the conveyor system prior to an injector such that the trimmer performs the automatic trimming of the foodstuff prior to injecting the foodstuff with a liquid solution by the injector.

Some aspects include a tangible, non-transitory, machine-readable medium storing instructions that when executed by a data processing apparatus cause the data processing apparatus to perform operations including the above-mentioned processes.

Some aspects include a system, including: one or more processors; and memory storing instructions that when executed by the processors cause the processors to effectuate operations of the above-mentioned processes.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
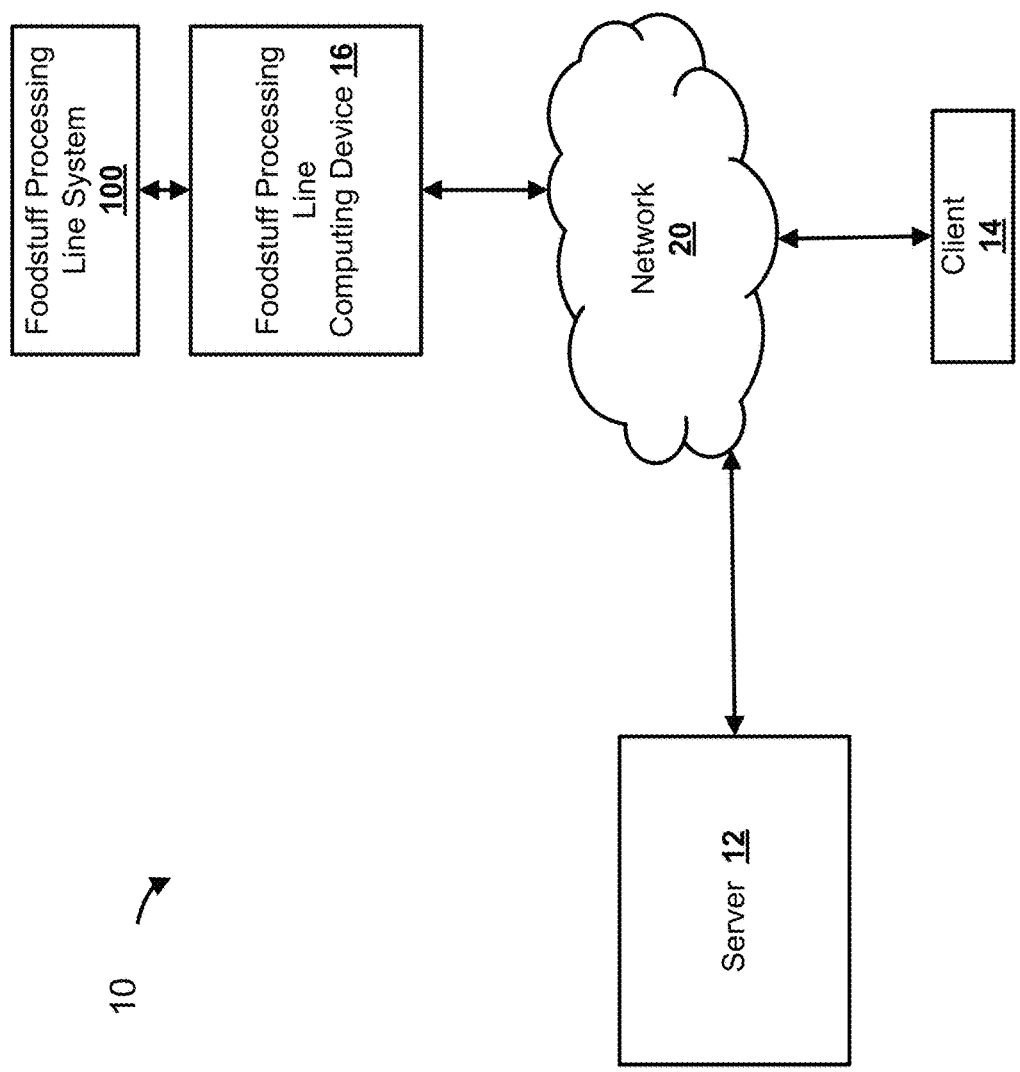
FIG. 1 illustrates a foodstuff processing computing environment in which the present techniques may be implemented according to some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of meat processing, pork belly trimming and processing, and bacon production. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

As discussed above, in the food industry, some meat cuts require processing before other types of processing can be performed on that meat cut or before the meat cut can be packaged and sold to a consumer. The following disclosure discusses the processing of pork bellies as an example but should not be limited to pork bellies as one of skill in the art in possession of the present disclosure will recognize that other meat cuts or foodstuff could benefit from the systems and methods discussed herein. With respect to pork belly processing, current processes require several steps before the pork belly is sliced into bacon or other foodstuff products. For example, during a first stage, each belly may be manually loaded into a pickling injector to be injected with a brine solution. Each belly is then manually combed and hung on a tree (e.g., 96 bellies/tree). Each tree is then weighed on a scale and is manually pushed through a staging area into a smokehouse (e.g., 44 trees per smokehouse). During a second stage, the trees loaded with the bellies dwell for approximately 5 hours in the smokehouse/cooker and then each tree is manually pushed into a chiller after the dwell time. During a third stage, the trees with the loaded bellies are chilled in the chiller for approximately 8 hours and then manually pushed into a finishing cooler. During a fourth stage, the trees with the loaded bellies dwell in the finishing cooler for approximately 10 hours and then weighed on a scale. The trees loaded with the cooled bellies are pushed into a press area after the dwell time.

At a fifth stage, each belly is removed from the tree and each comb is removed from each belly. Each belly is then manually placed onto a press, pressed, and trimmed. The trimmings may be used to make other meat products and each trimmed and pressed belly is manually stacked on a pallet. The empty trees and combs are then manually washed and pushed back to the injection room.

There are several shortfalls with the current process. One problem with the current process is the amount of manual labor required to complete the process. For example, manual labor is required to load the injectors, place bellies on combs, hang the combs on trees, move the loaded trees between the various stages, unload the bellies from the combs and trees before the press, and stack the pressed and trimmed bellies. While manual labor is a significant cost, the current process also results in a lot of waste. For example, bellies often fall from trees as the bellies are being moved and there are many points of contamination, which may require that the bellies be discarded. The trimming of the bellies results in inconsistent trimmings and those trimmings are often lost during the sawing process. Also, the trees and combs require further laborious efforts of cleaning and moving them back to the injection room. Further still, combs often break off in the bellies, which may require the bellies to be discarded or cause downtime in the process as a result of the machinery used in the pressing, trimming, or sawing/slicing processing hitting the combs, which can cause the machinery to break or malfunction.

The systems and methods of the present disclosure address these issues and provide for a foodstuff processing system that greatly increases sanitary operations and reduces manual labor, waste, production time, and downtime of the meat processing operations. The foodstuff processing system of the present disclosure includes an automated system where a foodstuff such as pork bellies or other meat cuts are loaded onto a foodstuff system processing line that includes a conveyor system that advances the product throughout the system. Each belly may have its raw weight measured on a first weigh belt and flattened by a flattener. The belly is then trimmed by a trimmer and the trimmings are collected. The belly may then be weighed again where its trimmed weight is recorded by a second weigh belt. The belly may then enter an injector where it is injected with liquid solution such as brine or pickling solution. After exiting the injector, a third weigh belt may measure and records a "green" weight of the belly. The belly may then enter a liquid smoke drencher for added flavor and color and then may enter a cooker for a dwell time based on the specifications of the final product (e.g., ~2 hours). The belly continues to a smoker for a dwell time based on the specifications of the final product (e.g., ~2 hours). After dwelling in the smoker, the belly may then continue to a chiller for a dwell time based on the specifications of the final product (e.g., ~3.5 hours). The smoker, the cooker, or the chiller may be spirally configured such that the belt inside of the component rotates and raises and lowers the belly in the vertical direction as the belly is prepared in those components. As such tens or hundreds of bellies may be cycling through those components at the same time. After dwelling in the chiller, the belly exits and is weighed again by a fourth weigh belt that measures and records a finished weight of the belly. The belly may then enter a press system, and after pressing, the belly is stacked on a pallet by a stacker device.

In various embodiments, the press system may include a redundant press such that if the first press is down, busy, or otherwise unavailable, the second redundant press may begin operating. Furthermore, the weights recorded at the first weigh belt, the second weigh belt, the third weigh belt, the fourth weight belt and any other weigh belt may be recorded in a foodstuff processing line computing device. The foodstuff processing line computing device may act as a central controller for the various systems in the foodstuff processing line system. Based on weights recorded or any other sensor information obtained from sensors or the components of the foodstuff processing line system, the foodstuff processing line computing device may determine instructions for the various subsystems (e.g., the injector, the cooker, the smoker, the chiller, the trimmer, conveyor system, or other components) and send those instructions to those subsystems to make adjustments on subsequent bellies that traverse the system. As such, the systems and methods of the present disclosure reduce the amount of manual labor to process a pork belly, decrease processing time and waste, reduce downtime, remove the need for combs and trees, provide a more regulated and consistent finished pork belly, provide for a more sanitary environment, or other improvements over conventional meat processing systems.

FIG. 1 illustrates an example of a computing environment 10 in which the present techniques may be implemented. In some embodiments, the computing environment 10 is a distributed computing environment implementing a client/server architecture, though other architectures are contemplated, including monolithic architectures executing on a single computing device. In some embodiments, the computing environment 10 includes a server 12, client computing devices 14, a foodstuff processing line computing device 16, a foodstuff processing line system 100, and a network 20, such as the Internet, by which these components may communicate.

In some embodiments, the client computing devices 14 are desktop computers, laptop computers, in-store kiosks, tablet computers, mobile phones, head-mounted displays, game consoles, set-top boxes or any other computing device that would be apparent to one of skill in the art in possession of the present disclosure, executing an operating system and a web browser or native application in which the described user interfaces are presented. One client computing device 14 is shown, but embodiments may support substantially more concurrent sessions, e.g., more than 100, or more than 1,000 geographically distributed sessions around the US or the world.

In some embodiments, the server 12 is a nonblocking web server or application program interface server configured to service multiple concurrent sessions with different client computing devices 14, for instance implementing a model-view-controller architecture or other design. In some embodiments, the server 12 may dynamically generate assets, markup language instructions, and scripting language instructions responsive to requests from client computing devices 14 to send user interfaces to, or update user interfaces on, those client computing devices 14. The user interface may evolve over time (e.g., in a web application), in some cases, displaying new resources (e.g., images and other data) sent from the server 12 responsive to user inputs to the user interface.

A configuration engine and rendering engine included on the server may be used to generate image files and metadata used by the server 12 to generate the user interfaces or application environments that would be apparent to one of skill in the art in possession of the present disclosure and benefit from the teachings of the present disclosure.

In some embodiments, the foodstuff processing line computing device 16 is a computing device configured to receive information from the foodstuff processing line system 100, provide instruction to the foodstuff processing line system 100, provide information to the server 12, or receive information or instruction from the server 12. While the server 12 and the foodstuff processing line computing device 16 are illustrated as separate devices, various embodiments of the present disclosure may include a single or distributed server that controls the foodstuff processing line system 100 or a single or distributed local foodstuff processing line computing device that controls and interacts with the foodstuff processing line system 100. While a particular computing environment 10 for the controlling the foodstuff processing line system 100 is illustrated, one of skill in the art in possession of the present disclosure will recognize that other configurations, computing devices, and computing environments may be contemplated.

Figure 2A:
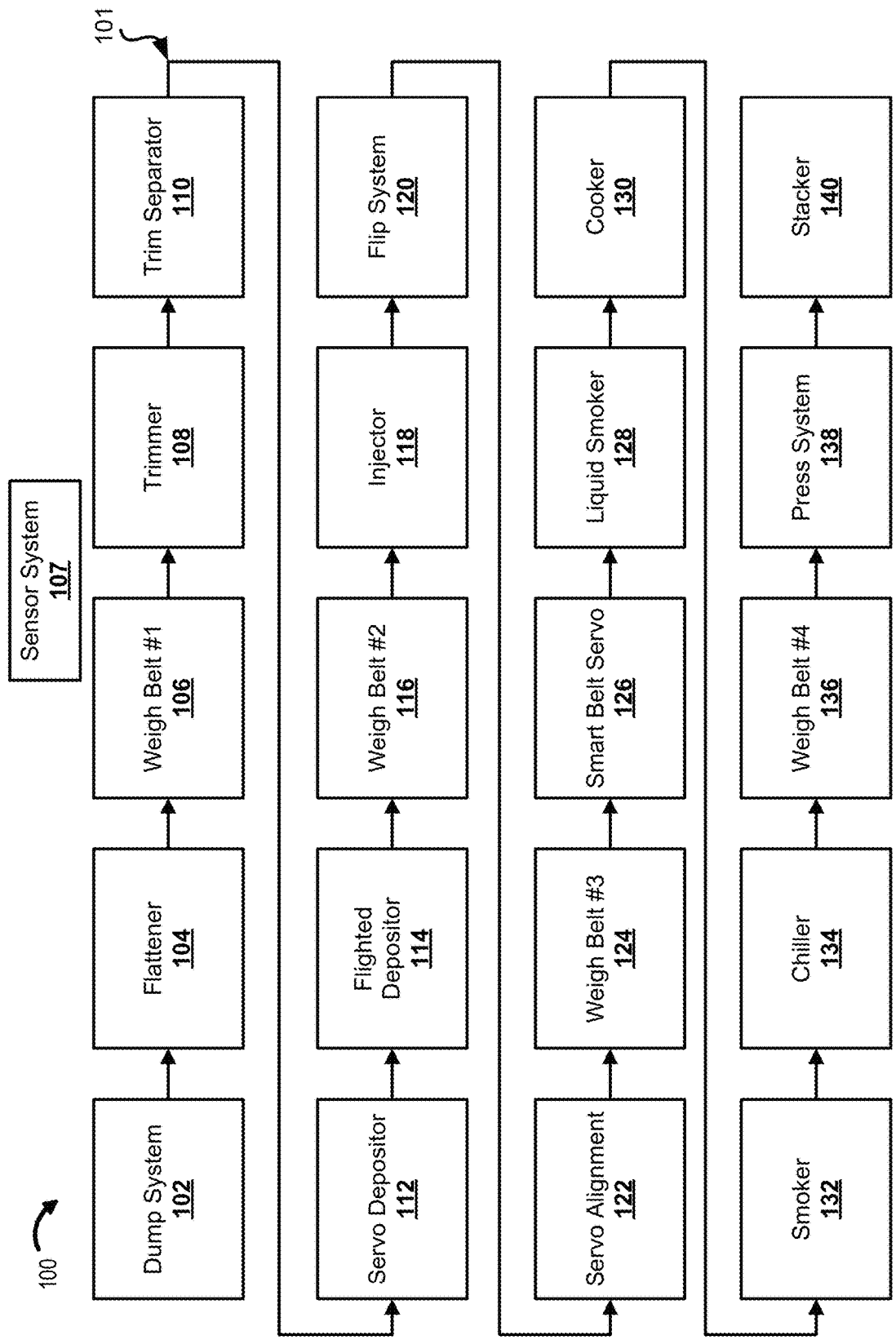
FIG. 2A is a block diagram illustrating an example of a foodstuff processing line system of the foodstuff processing computing environment of FIG. 1, in accordance with some embodiments of the present disclosure.
Figure 2B:
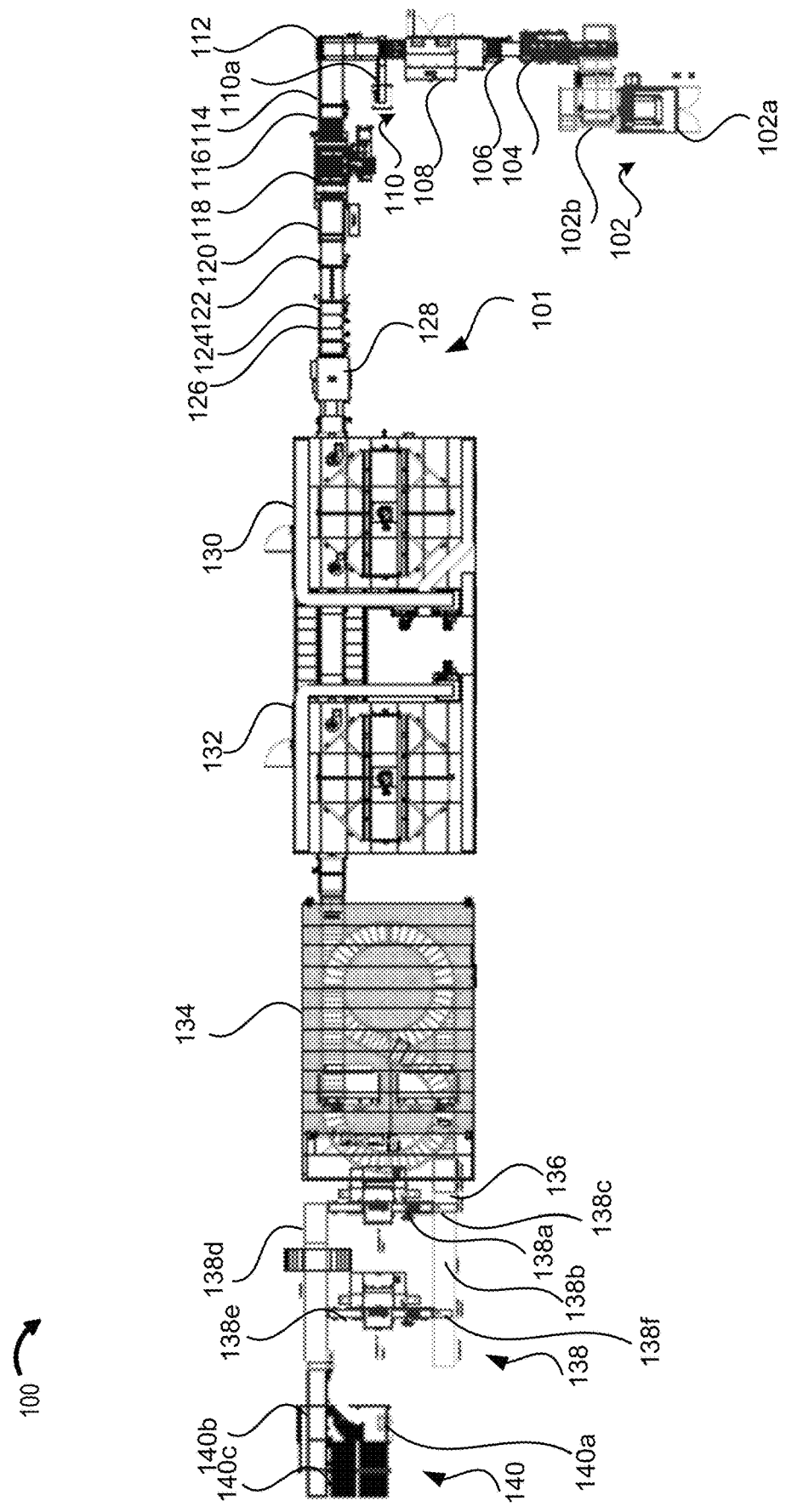
FIG. 2B is a schematic diagram illustrating an example of the foodstuff processing line system of the foodstuff processing computing environment of FIG. 1, in accordance with some embodiments of the present disclosure.

FIGS. 2A and 2B illustrate an embodiment of the foodstuff processing line system 100 as discussed above with reference to FIG. 1. As discussed above, the foodstuff processing line system 100 may move a foodstuff along to various subsystems to process the foodstuff. For ease of explanation, pork bellies or other animal bellies are described as the foodstuff herein. However, one of skill in the art in possession of the present disclosure will recognize that the foodstuff processing line may process other foodstuff (e.g., different meat slabs) and still fall under the scope of the present disclosure. In the illustrated embodiment, the foodstuff processing line system 100 may include a conveyor system 101 and a dump system 102. The dump system 102 may be where bellies enter the foodstuff processing line system 100. The dump system 102 may include a dump hoist 102a to assist a user in loading bellies on the conveyor system 101. The conveyor system 101 may include a plurality of conveyors that are interconnected to advance the belly through the various components and processes of the foodstuff processing line system 100. The dump system 102 may also include sorting conveyor 102b that may be used to sort and position the bellies before entering the next stage of the foodstuff processing line system 100. The sorting conveyor 102b and the dump hoist 102a may be sorting conveyors and dump hoists manufactured by American Food Equipment (AMFEC), headquartered in Caldwell, Idaho or other sorting conveyors and dump hoists that would be apparent to one of skill in the art in possession of the present disclosure.

An output of the dump system 102 may be coupled to an input of a flattener 104 via the conveyor system 101. The flattener 104 may further conform a belly and flatten the belly to a uniform position and shape for the further processing of the belly in the foodstuff processing line system 100. The flattener 104 may include an upper and lower dual conveyor flattener that can flatten multiple bellies at the same time. The flattener 104 may be a flattener manufactured by Fusion Tech, headquartered in Roseville, Illinois or any other flattener that would be apparent to one of skill in the art in possession of the present disclosure.

In various embodiments, an output of the flattener 104 may be coupled to an input of a weigh belt 106 via the conveyor system 101. The weigh belt 106 may weigh the belly as it passes through the weigh belt 106. The weigh belt 106 may communicate the weight of the belly to the foodstuff processing line computing device 16. A foodstuff entry for the particular belly may be created and the weight recorded in a foodstuff processing line database included in the foodstuff processing line computing device 16. The foodstuff entry may be created based on a count performed by the foodstuff processing line computing device 16 and each belly may be assigned its own belly identifier. The weight of the belly, when weighed by weigh belt 106, may be referred to as a raw weight. The weigh belt 106 may include a weigh belt manufactured by Boston Conveyor and Automation (BCA) headquartered in Newburyport, Massachusetts or any other scale or weigh belt that would be apparent to one of skill in the art in possession of the present disclosure.

In various embodiments, the conveyor system 101 may include a sensor system 107. The sensor system 107 may include an imaging sensor (e.g., a two-dimensional image capturing camera, a three-dimensional image capturing camera, an infrared image capturing camera, an ultraviolet image capturing camera, a depth capturing camera, similar video recorders, or a variety of other image or data capturing devices) that is coupled to the foodstuff processing line computing device 16 or the server 12 through the network 20. The imaging sensor 222 may be a camera, a photodetector, or any other photo sensor device that may be used to gather visual information from a conveyor system 101 such as visual information of each foodstuff or belly as it advances from the weigh belt 106. The visual information such as photos will be provided to the foodstuff processing line computing device 16 and stored in a database where an artificial intelligence engine will compare the visual information against a foodstuff model to determine the quality of the foodstuff and the supplier's performance relative to the foodstuff's specification. The artificial intelligence engine may be able to identify flaws in the foodstuff (e.g., such as holes, odd shapes, undersized bellies, or the like). From that the user will be able to provide feedback to a raw materials purchasing team to review with suppliers. While the sensor system 107 is illustrated as being between the weigh belt 106 and the trimmer 108, the sensor system 107 may include sensors at one or more other locations along the conveyor system 101 for quality control purposes or other purposes that would be apparent to one of skill in the art in possession of the present disclosure. Furthermore, the sensor system 107 may include other sensors such as a temperature sensor, humidity sensor, a pressure sensor (e.g., a barometer), or other sensors that would be apparent to one of skill in the art in possession of the present disclosure.

In various embodiments, the output of the weigh belt 106 may be coupled with an input of a trimmer 108 via the conveyor system 101. The trimmer 108 may trim the edges of the belly to achieve a uniform shape and to remove excess fat and other edge pieces of the belly. In various embodiments, the trimmer 108 may include a vision-controlled water jet trimmer such as a vision-controlled water jet trimmer manufactured by John Bean Technologies headquartered in Chicago, Illinois or any other trimmer that would be apparent to one of skill in the art in possession of the present disclosure. The vision-controlled water jet trimmer may include cameras and software that are used to identify fat, and determine shape, thickness, weight, and other attributes of the belly. The trimmings from the belly may be outputted by the trimmer 108 to an input of a trim separator 110 that automatically removes and retrieves the trimmings generated from by the trimmer 108. The trim separator 110 may include a trim takeaway conveyor 110a that removes the trimmings from the foodstuff processing line system 100. The trimmings may be used to create various meat products. By removing having the trimmer 108 at the beginning of the conveyor system 101, the trimmings may be removed before cooking, smoking, chilling and injecting the belly with brine as the trimmings do not necessarily need to be processed in the same manner as the rest of the belly. As such, more uniform, efficient, consistent brine injection of the belly may be performed. Furthermore, in conventional systems where the trimming in performed after pressing the belly may benefit from moving the trimmer toward the beginning of the conveyor system 101 as bellies that have not been trimmed can be processed differently and some bellies are too large to be pressed which creates poor slicing performance when the bellies are ultimately sliced into bacon.

In various embodiments, an output of the trimmer 108 may be coupled with an input of a servo depositor 112 via the conveyor system 101. The servo depositor 112 may be configured to automatically change the direction of the belly to a desired position. The servo depositor 112 may include a servo motor and actuator that changes the direction of the belly. As illustrated in FIG. 2B, the servo depositor 112 may be used to change the position of the belly while it is making a 90 degree turn in the conveyor line. In a specific example, the servo depositor 112 may change the belly from the short edge of the belly leading to the long edge of the belly leading. In various embodiments the servo depositor 112 may be optional and may a servo depositor conveyor manufactured by BCA or any other depositor that would be apparent to one of skill in the art in possession of the present disclosure. The output of the servo depositor 112 may be coupled to an input of a flighted depositor 114 that may perform servo-controlled belly directional and elevation change transfer. The flighted depositor 114 may include a flighted servo manufactured by BCA or other depositor that would be apparent to one of skill in the art in possession of the present disclosure.

In various embodiments, an output of the flighted depositor 114 may be coupled with an input of a weigh belt 116 via the conveyor system 101. The weigh belt 106 may weigh the belly as it passes through the weigh belt 116. The weigh belt 116 may communicate the weight of the belly to the foodstuff processing line computing device 16 after the trimming process to determine the weight of the trimmings and a trimmed weight of the belly. The trimming weight (weight measured at weigh belt 106—weight measured at weigh belt 116) and a trimmed weight may be recorded in the entry for the belly in the foodstuff processing line database of the foodstuff processing line computing device 16. The weigh belt 116 may include a weigh belt manufactured by BCA or other weigh belt or scale that would be apparent to one of skill in the art in possession of the present disclosure. In various embodiments, the servo depositor 112 and the flighted depositor 114 may be optional such that the input of the weigh belt 116 is coupled to the output of the trimmer 108. In other embodiments, the order of the servo depositor 112, the flighted depositor 114, or the weigh belt 116 may be changed. The servo depositor 112 and the flighted depositor may be important to changing the orientation of the belly on the convey system 101. For example, the belly should be short-side leading into the trimmer 108, but preferably may be long-side-leading into the cooker 130 to maximize the number of bellies in the cooker 130 concurrently.

In various embodiments and continuing with the illustrated example, an output of the weigh belt 116 may be coupled with an input of an injector 118 via the conveyor system 101. The injector 118 may inject the belly with a liquid solution such as brine solution. The amount of the liquid solution injected into the belly may depend on the measured weight of the belly at the weigh belt 116. The injector 118 may include an injector conveyor system manufactured by Nowicki in Burr Ridge, Illinois. In a particular example, the injector 118 may include a 516 needle dual head servo injector with a long side leading design. However, one of skill in the art in possession of the present disclosure will recognize that other injectors may be contemplated and fall under the scope of the present disclosure.

In various embodiments, an output of the injector 118 may be coupled with an input of a flip system 120 via the conveyor system 101. The flip system 120 may automatically flip the belly for proper pre-cook orientation. For example, the flip system may flip the belly so that that belly is fat-side-up. The flip system 120 may include a flip conveyor manufactured by Nowicki or any other flip system that would be apparent to one of skill in the art in possession of the present disclosure. The flipping of the belly to be fat-side-up is important to the cooking and smoking process. However, the it is preferable to inject the belly with brine fat-side-down so that the brine is injected into the tissue of the belly rather than the fat. As such, the flip system 120 should be after the injector 118 in the conveyor system 101 but before the cooker 130.

In various embodiments, an output of the flip system 120 may be coupled with an input of a servo alignment landing conveyor 122 via the conveyor system 101. The servo alignment landing conveyor 122 may align the belly for the cooking alignment. The servo alignment landing conveyor 122 may include a servo alignment landing conveyor manufactured by BCA any other servo alignment landing conveyor that would be apparent to one of skill in the art in possession of the present disclosure.

In various embodiments, an output of the servo alignment landing conveyor 122 may be coupled with an input of a weigh belt 124 via the conveyor system 101. The weigh belt 124 may weigh the belly as it passes through the weigh belt 124. The weigh belt 124 may communicate the weight of the injected belly to the foodstuff processing line computing device 16 after the injection process to determine brine weight and an injected weight of the belly. The brine weight (weight measured at weigh belt 106—weight measured at weigh belt 116) and the injected belly weight (e.g., "green weight") may be recorded in the entry for the belly in the via the foodstuff processing line database of the foodstuff processing line computing device 16. The weigh belt 116 may include a weigh belt manufactured by BCA. In various embodiments, other ordering of the weigh belt 124, servo alignment landing conveyor 122, and the flip system may be contemplated. For example, the weigh belt 124 may be first in the series of the three components rather than the last.

In various embodiments, an output of the weigh belt 124 may be coupled with an input of a smart belt servo 126. The smart belt servo 126 may provide automated gap adjustment to provide consistent or predetermined spacing between the bellies before the bellies enter a cooker. The smart belt servo 126 may include one or more smart belts manufactured by BCA or any other spacing system that would be apparent to one of skill in the art in possession of the present disclosure.

In various embodiments, an output of the smart belt servo 126 may be coupled to an input of a liquid smoker 128 via the conveyor system 101. The liquid smoker 128 may drench the belly with a liquid smoke solution to add flavor and coloring to the belly. The liquid smoker 128 may include a liquid smoke drencher manufactured by Protech headquartered in Bedford, Bedfordshire Great Britain or other liquid smoke drenchers that would be apparent to one of skill in the art in possession of the present disclosure.

In various embodiments, an output of the liquid smoker 128 may be coupled to an input of a cooker 130 via the conveyor system 101. The cooker 130 may be a spiral cooker where the belly rotates around the cooker 130 on a conveyor in the cooker for a duration set by the user and exits an output of the cooker 130 after that cook duration. The duration of the cooking time may be, for example, 2 hours. The cooker 130 may include a spiral cooker manufactured by Protech or another cooker that would be apparent to one of skill in the art in possession of the present disclosure.

In various embodiments, an output of the cooker 130 may be coupled to an input of a smoker 132 via the conveyor system 101. The smoker 132 may be a spiral smoker where the belly rotates around the smoker 132 on a conveyor in the smoker 132 for a duration set by the user and exits an output of the smoker 132 after that smoke duration. The duration of the smoke time may be, for example, 2 hours. The smoker 132 may include a spiral smoker manufactured by Protech or another smoker that would be apparent to one of skill in the art in possession of the present disclosure. In various embodiments, the smoker 132 and the cooker 130 may be a single component that both smokes and cooks the belly.

In various embodiments, an output of the smoker 132 may be coupled to an input of a chiller 134 via the conveyor system 101. The chiller 134 may be a spiral chiller where the belly rotates around the chiller 134 on a conveyor in the chiller 134 for a duration set by the user and exits an output of the chiller 134 after that chilling duration. The duration of the chill time may be, for example, 3-4 hours. The chiller 134 may include a spiral chiller manufactured by Tecnopool headquartered in Bosco, PD, Italy, or any other chiller that would be apparent to one of skill in the art in possession of the present disclosure.

In various embodiments, an output of the chiller 134 may be coupled with an input of a weigh belt 136 via the conveyor system 101. The weigh belt 136 may weigh the belly as it passes through the weigh belt 136. The weigh belt 136 may communicate the weight of the finished belly to the foodstuff processing line computing device 16 after the chilling process to determine a final weight of the belly. The weight loss during the cook, smoke, and chill processes and the final weight may be recorded in the entry for the belly in the foodstuff processing line database provided by the foodstuff processing line computing device 16. The weigh belt 136 may include a weigh belt manufactured by BCA or other scales that would be apparent to one of skill in the art in possession of the present disclosure.

In various embodiments, an output of the weigh belt 136 may be coupled with an input of a press system 138 via the conveyor system 101. The press system 138 may press and mold the final belly into a final predetermined shape. The press system 138 may include a press 138a. The belly may be received from the weigh belt 136 on a conveyor 138b, and a stop plate and pusher 138c may push the belly from the conveyor 138b into the press 138a. The press 138a may press the belly and the press 138a may output the pressed belly on a conveyor 138d. The press system 138 may include a redundant press 138e. If the press 138a is down, malfunctioned, busy, or is otherwise not available. The belly may be received from the weigh belt 136 on the conveyor 138b, and a stop plate and pusher 138f may push the belly from the conveyor 38b into the press 138e. The press 138e may press the belly and the press 138e may output the pressed belly on the conveyor 138d. In some embodiments, the presses 138a and 138e, the conveyor 138b and 138d, and the stop plates and pushers 138c and 138f may be components manufactured by Danfotech headquartered in Aalborg, Denmark. However, other foodstuff presses, conveyors, or stop plates and pushers may be contemplated by one of skill in the art in possession of the present disclosure.

In various embodiments, an output of the press system 138 may be coupled with an input of a stacker system 140 via the conveyor system 101. The stacker system 140 may include any belly stacker that stacks the bellies on a pallet. In one example, the stacker system 140 may include a robotic stacker 140a that includes a robotic arm that removes the belly from a conveyor 140b and onto a pallet 140c. For example, the stacker system 140 may include a robotic cell manufactured by K2 Kinetics headquartered in York, Pennsylvania or other robotic cells or automatic stackers that would be apparent to one of skill in the art in possession of the present disclosure. The pallet 140c with stacked bellies may be stored or moved to another processing line for sawing the bellies into bacon or other foodstuff. While a specific foodstuff processing line system 100 is illustrated and described, one of skill in the art in possession of the present disclosure will recognize that the foodstuff processing line system 100 of the present disclosure may include a variety of components and component configurations while remaining within the scope of the present disclosure as well.

Figure 3:
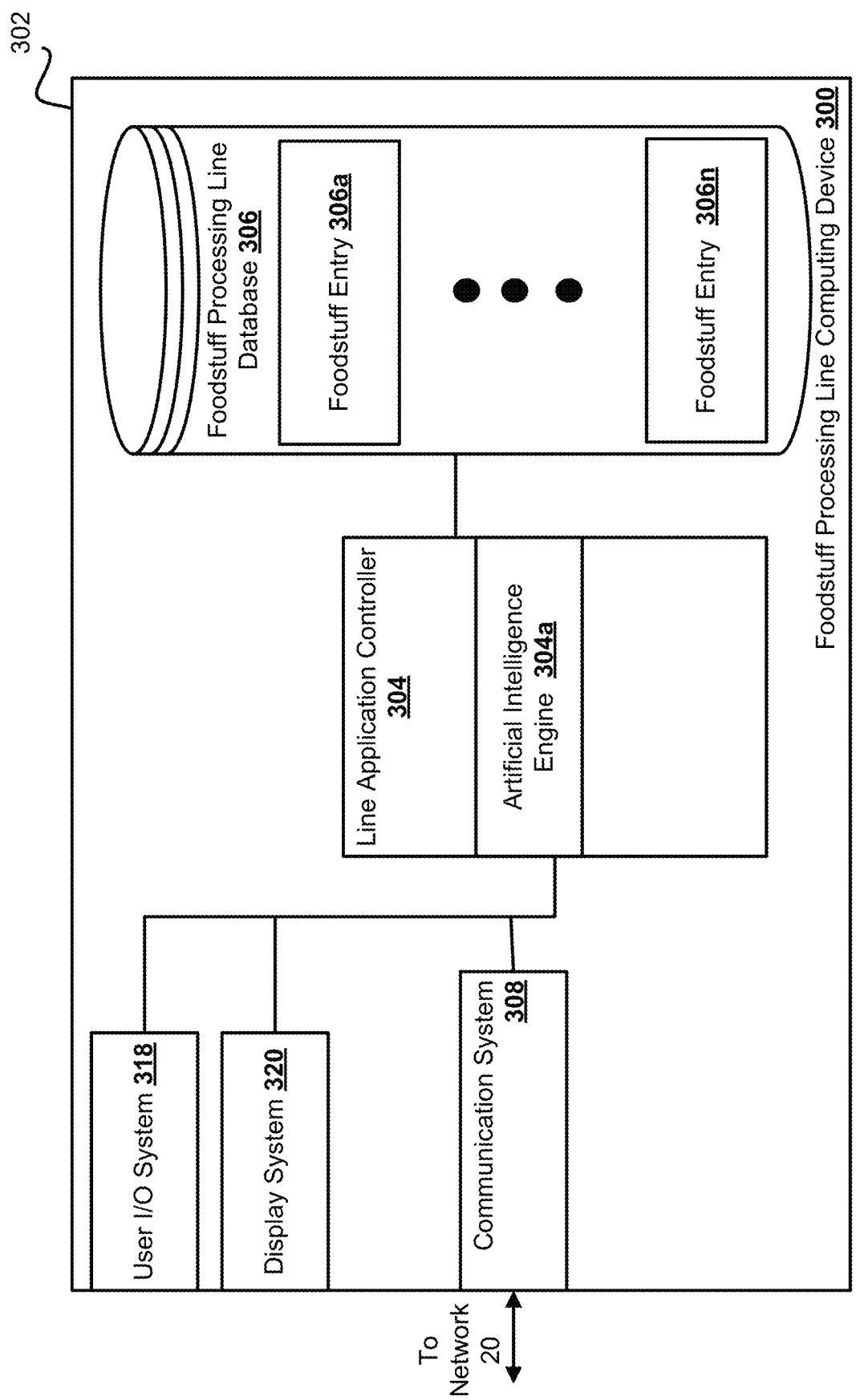
FIG. 3 is a block diagram illustrating an example of a foodstuff processing line computing device of the foodstuff processing computing environment of FIG. 1, in accordance with some embodiments of the present disclosure.

Referring now to FIG. 3, an embodiment of a foodstuff processing line computing device 300 is illustrated that may provide the foodstuff processing line computing device 16 discussed above with reference to FIG. 1. In the illustrated embodiment, the foodstuff processing line computing device 300 includes a chassis 302 that houses the components of the foodstuff processing line computing device 300, only some of which are illustrated and discussed below.

For example, the chassis 302 may house a processing system (not illustrated) and a non-transitory memory system (not illustrated) that includes instructions that, when executed by the processing system, cause the processing system to provide a line application controller 304 that is configured to perform the functions of the line application controllers or foodstuff processing line computing devices to provide a processing line application, discussed below. The line application controller 304 may include an artificial intelligence engine 304a that may be configured to generate a machine learning model for one or more processes in the conveyor system 101. For example, the machine learning model may be generated using visual information of the foodstuff and use that machine learning model to determine quality of the foodstuff at one or more points in the conveyor system 101 using visual information of each foodstuff obtained from the sensor system 107.

The chassis 302 may also house a storage system that is coupled to the line application controller 304 (e.g., via a coupling between the storage system and the processing system) and that includes a foodstuff processing line database 306 that is configured to store any of the information utilized by the line application controller 304 discussed below. Specifically, the foodstuff processing line database 306 may include a foodstuff library that may include a plurality of foodstuff entries 306a and up to 306n. The chassis 302 may also house a communication system 308 that is coupled to the line application controller 304 (e.g., via a coupling between the communication system 308 and the processing system) and that may be provided by a Network Interface Controller (NIC), wireless communication systems (e.g., BLUETOOTH®, Near Field Communication (NFC)

components, Wi-Fi components, etc.), and/or any other communication components that would be apparent to one of skill in the art in possession of the present disclosure. As such, the communication system 308 may provide for the connection (e.g., a wireless connection such as a Wi-Fi connection) of the foodstuff processing line computing device 300 to a management network provided by the network 20.

In various embodiments, the chassis 302 also houses a user Input/Output (I/O) system 318 that is coupled to the line application controller 304 (e.g., via a coupling between the processing system and the user I/O system 318). In an embodiment, the user I/O system 318 may be provided by a keyboard input subsystem, a mouse input subsystem, a track pad input subsystem, a touch input display subsystem, a microphone, an audio system, a haptic feedback system, and/or any other input subsystem. The chassis 302 also houses a display system 320 that is coupled to the line application controller 304 (e.g., via a coupling between the processing system and the display system 320) and may be included in the user I/O system 318. In an embodiment, the display system 320 may be provided by a display device that is integrated into the foodstuff processing line computing device 300 and that includes a display screen (e.g., a display screen on a laptop/notebook computing device, a tablet computing device, a mobile phone, or wearable device), or by a display device that is coupled directly to the foodstuff processing line computing device 300 (e.g., a display device coupled to a desktop computing device by a cabled or wireless connection). However, while a specific foodstuff processing line computing device 300 has been illustrated and described, one of skill in the art in possession of the present disclosure will recognize that meat processing line computing devices (or other devices operating according to the teachings of the present disclosure in a manner similar to that described below for the foodstuff processing line computing device 300) may include a variety of components and/or component configurations for providing conventional mobile device functionality, as well as the functionality discussed below, while remaining within the scope of the present disclosure as well.

Figure 4:
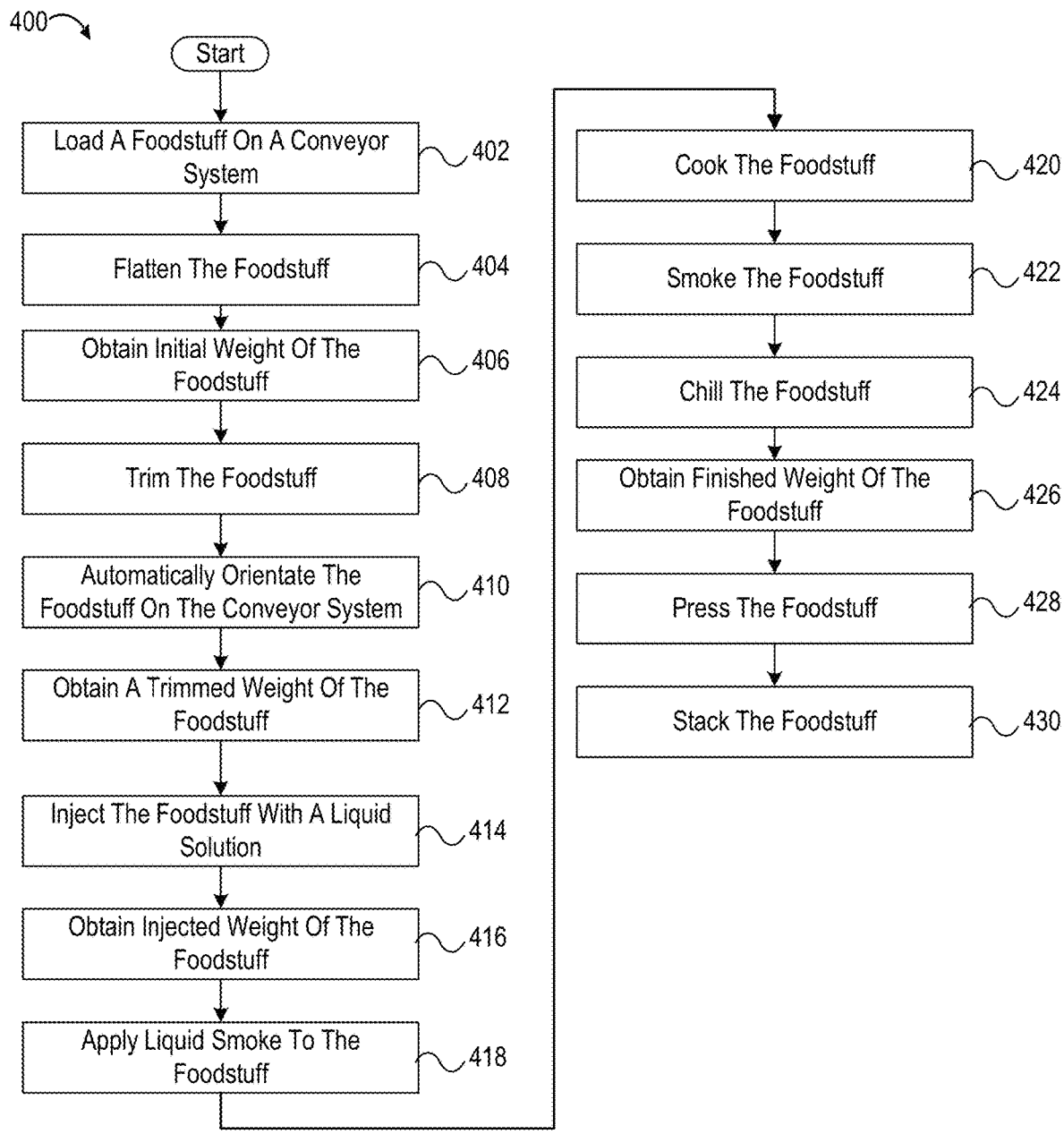
FIG. 4 illustrates a flowchart of a process of foodstuff processing by the foodstuff processing line system, in accordance with some embodiments of the present disclosure.

In some embodiments, the server 12, the meat processing line computing device 16, the client 14, the foodstuff processing line system 100 or the individual components of the foodstuff processing line system 100 may execute a process 400 of FIG. 4, for example, by executing program code stored on a tangible, non-transitory, machine-readable medium. The illustrated operations may be executed in a different order, omitted, replicated, executed concurrently, executed serially, have additional operations inserted, all be automated, involve human intervention, or otherwise be modified relative to the arrangement depicted, which is not to suggest that any other description herein is limiting.

In some embodiments, the process 400 is illustrated in FIG. 4. The process 400 may begin at block 402 where a foodstuff is loaded on a conveyor system included in a foodstuff processing line system. In an embodiment, at block 402, a foodstuff such as a pork belly may be loaded on a conveyor system 101 included on the foodstuff processing line system 100. The belly may be loaded using the dump system 102 described above. The conveyor system 101 may include some or all the components included in the foodstuff processing line system 100 and may include one or more other conveyors as well to advance the belly through the foodstuff processing line system 100. The process 400 may proceed to block 404 where the food stuff is flattened. In an embodiment, at block 404, a flattener such as the flattener 104 may flatten the belly as described above. The process 400 may proceed to block 406 where the foodstuff is weighed to obtain an initial weight of the foodstuff. In an embodiment, at block 406, the weigh belt 106 may weigh the belly. The weigh belt 106 may send the initial weight of the belly to the foodstuff processing line computing device 16 where a foodstuff entry, such as the foodstuff entry 306a, is created and an identifier is assigned to the belly.

The process 400 may proceed to block 408 where the foodstuff is trimmed. In an embodiment, at block 408 the trimmer 108 may trim the belly. For example, the trimmer 108 may receive the belly and automatically trim, based on trimming instructions, the belly that results in trimmings and a trimmed belly. In a specific embodiment, the trimmer may be a water jet trimmer. The conveyor system 101 may advance the trimmings and the trimmed belly to the trim separator 110 to separate the trimmings from the trimmed belly. The trimmings may exit the foodstuff processing line system 100 via a trim takeaway conveyor while the trimmed belly advances on the conveyor system 101.

The process 400 may proceed to block 410 where the foodstuff is automatically orientated to a predetermined orientation. In an embodiment, at block 410, the belly may be orientated based on the stage in the belly processing the belly is about to enter or based on the conveyor system 101 layout for the environment or building the conveyor system 101 is located. For example, the servo depositor 112 may automatically change the direction of the belly (e.g., short-side-leading to long-side-leading). Similarly, the flighted depositor 114 may change the direction and elevation of the belly on the conveyor system 101. In other examples, the flip system 120 may flip the belly fat-side-up prior to being cooked by the cooker 130. In another example of belly orientation during the foodstuff processing line process, the servo alignment landing conveyor 122 may align the belly and provide a gate system for orientation with respect to other bellies on the conveyor system 101 prior to cooking. Similarly, the smart belt servo 126 may orientate the belly with respect to other bellies by adjusting the gap between the belly and other bellies prior to entering the cooker 130. Spacing may be important to ensure that the cooker 130 is efficiently loaded with bellies. These and other conveyor system components may be used throughout the foodstuff processing line process to change the orientation of the belly with respect to the conveyor system 101 and may be based on the stage in foodstuff processing line process.

The process 400 may proceed to block 412 where the foodstuff is weighed to obtain a trimmed weight of the foodstuff. In an embodiment, at block 412, the weigh belt 116 may weigh the belly after trimming. The weigh belt 116 may send the trimmed weight of the belly to the foodstuff processing line computing device 16 where it is entered into the foodstuff entry for that belly. A trimming weight of the trimmings may be calculated from the difference of the initial weight and the trimmed weight. The trimmed weight or the trimming weight may be used by the line application controller 304 to adjust instructions used by the various components of the foodstuff processing line system 100. For example, the line application controller 304 may generate new trimming instructions to send to the trimmer 108 for a subsequent belly based on at least one of the trimming weight or the trimmed weight. The trimming instructions may cause the trimmer 108 to trim the subsequent belly differently. Similarly, the line application controller 304 may generate new injection instructions to send to the injector 118 for the belly based on at least one of the trimming weight or the trimmed weight. The injection instructions may cause the injector 118 to inject the liquid solution according to the specific trimmed weight.

The process 400 may proceed to block 414 where a liquid solution is injected into the trimmed foodstuff to generate an injected foodstuff. In an embodiment, at block 414, the injector 118 may receive the trimmed belly via the conveyor system 101 and inject the belly with a liquid solution (e.g., a brine solution) according to injection instructions that operate the injector 118. The conveyor system may advance an injected belly out of the injector. The injection instructions may include instructions for a depth of injection, an amount of liquid solution to be injected, or other attributes that would be apparent to one of skill in the art in possession of the present disclosure.

The process 400 may proceed to block 416 where the foodstuff is weighed to obtain an injected weight of the foodstuff. In an embodiment, at block 416, the weigh belt 124 may weigh the belly after it is injected. The weigh belt 124 may send the injected weight of the belly to the foodstuff processing line computing device 16 where it is entered into the foodstuff entry for that belly. An injection weight of the injection may be calculated from the difference of the trimmed weight and the injected weight. The injected weight or the injection weight may be used by the line application controller 304 to adjust instructions used by the various components of the foodstuff processing line system 100. For example, the line application controller 304 may generate new injection instructions to send to the injector 118 for subsequent bellies based on at least one of the injected weight or the injection weight. For example, the line application controller 304 may determine that not enough brine solution or too much brine solution is being injected into the bellies and the new injection instructions may adjust the amount of brine solution being injected or adjust the position (e.g., depth) of the needles that are penetrating the belly.

The process 400 may proceed to block 418 where liquid smoke is applied to the foodstuff. In an embodiment, at block 418, the liquid smoker 128 may receive the belly via the conveyor system 101 and apply liquid smoke to the belly before the conveyor system 101 advances the belly to the cooker 130. The process 400 may proceed to block 420 where the foodstuff is cooked. In an embodiment, at block 420, the cooker 130 may receive the belly via the conveyor system 101 and cook the belly for a predetermined dwell time and based on other cooking instructions (e.g., temperature, humidity, or other attributes). In the example where the cooker 130 includes a spiral cooker and dryer, the belly continuously advances on a spiral conveyor for the duration of the dwell time before exiting the cooker 130 via the conveyor system 101.

The process 400 may proceed to block 422 where the foodstuff is smoked. In an embodiment, at block 422, the smoker 132 may receive the belly via the conveyor system 101 and smoke the belly for a predetermined dwell time and based on other smoking instructions (e.g., temperature, humidity, smoke concentration, or other attributes). In the example where the smoker 132 includes a spiral smoker, the belly continuously advances on a spiral conveyor for the duration of the dwell time before exiting the smoker 132 via the conveyor system 101. In some embodiments, the smoking and cooking may occur simultaneously in a cooker/smoker combination.

The process 400 may proceed to block 424 where the foodstuff is chilled. In an embodiment, at block 424, the chiller 134 may receive the belly via the conveyor system 101 and chill the belly for a predetermined dwell time to obtain a desired temperature and based on chilling instructions (e.g., temperature, speed of an internal conveyor, or other attributes). In the example where the chiller 134 includes a spiral chiller, the belly continuously advances on a spiral conveyor for the duration of the dwell time before exiting the chiller 134 via the conveyor system 101.

The process 400 may proceed to block 426 where the foodstuff is weighed to obtain a finished weight of the foodstuff. In an embodiment, at block 426, the weigh belt 136 may weigh the belly after it is chilled. The weigh belt 136 may send the finished weight of the belly to the foodstuff processing line computing device 16 where it is entered into the foodstuff entry for that belly. A difference in weight between the injected weight and the finished weight may be calculated. The finished weight or the difference in weight may be used by the line application controller 304 to adjust instructions used by the various components of the foodstuff processing line system 100. For example, the line application controller 304 may generate new cooker instructions to send to the cooker 130 for subsequent bellies, generate new smoker instructions to send to the smoker 132 for subsequent bellies, generate new chilling instructions to send to the chiller 134 for subsequent bellies, or generate new instructions for any of the other components in the foodstuff processing line system 100.

The process 400 may proceed to block 428 where the chilled foodstuff is pressed. In an embodiment, at block 428, the press 138a included the press system 138 may receive the belly via the conveyor system 101 and press the chilled belly according to pressing instructions (e.g., amount of force applied, shape, or other controllable attributes). The pressed belly may be advanced via the conveyor system 101. In various embodiments, there may be a redundant press included in the press system 138 such as the press 138e. The line application controller 304 or the press 138e may determine that the press 138a is not available from signals it receives from the press 138a or lack of communication signals received. The press 138e may then be activated and pressing instructions may be sent to the press 138e. Furthermore, conveyor instructions may be sent to the conveyor system 101 to advance the chilled belly to the press 138e and the press 138e may receive the chilled belly via the stop plate and pusher 138f. The press 138e may then perform the pressing of the belly. The conveyor system 101 may then advance the belly.

The process 400 may proceed to block 430 where the foodstuff is stacked. In an embodiment, at block 432, the stacker system 140 may stack the pressed bellies on pallets or other containers for storage or for further processing. For example, the robotic stacker 140a that includes a robotic arm may removes the belly from the conveyor 140b and onto the pallet 140c. The belly may then be ready for sale or advanced to a slicing process, an oven process for further cooking, or stored in cold storage.

In various embodiments of process 400, quality checks of the foodstuff may be performed using sensor data from the sensor system 107 and the artificial intelligence engine 304a. A machine learning algorithm in the artificial intelligence engine 304c may assist and reveal potential defects or qualities of each foodstuff. For example, feature points may be obtained from the visual information generated by the sensor system 107 and compared to feature points of foodstuff in a database to determine whether matches or similarity conditions exist and use information associated with those foodstuffs to identify qualities of the foodstuff. That information whether a good quality or a poor quality may be provided to the user. Based on what the user does with the information, the machine learning algorithm may use that action information as feedback in making more meaningful and accurate feedback.

Figure 6:
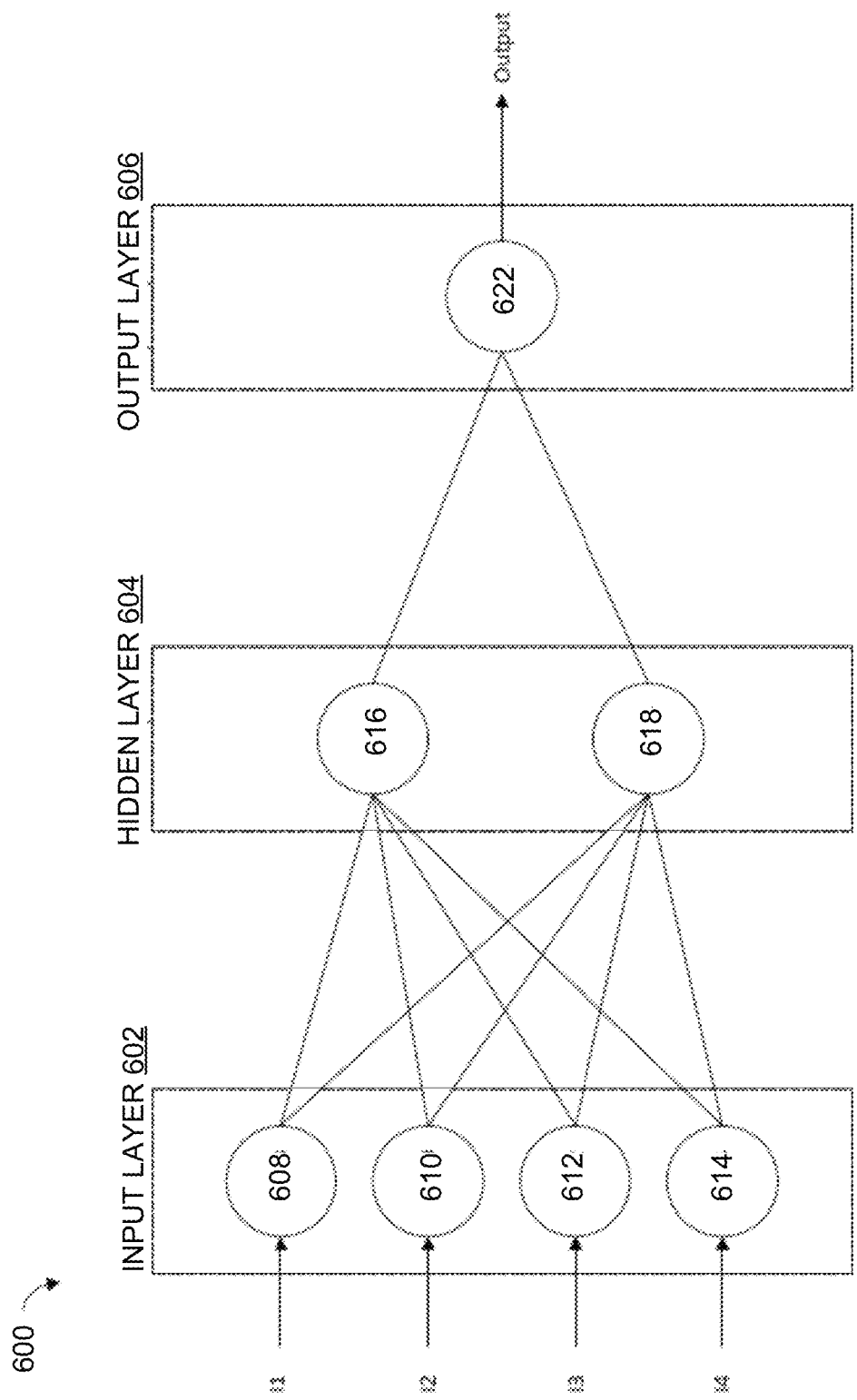
FIG. 6 illustrates an artificial neural network used in the foodstuff processing computing environment of FIG. 1, in accordance with some embodiments of the present disclosure.

Referring now to FIG. 6, an artificial neural network according to an embodiment of the present disclosure is illustrated. An example artificial intelligence engine 304a may be implemented as an artificial neural network 600. As illustrated, the artificial neural network 600 includes three layers—an input layer 602, a hidden layer 604, and an output layer 606. Each of the layers 602, 604, and 606 may include one or more nodes. For example, the input layer 602 includes nodes 608-614, the hidden layer 604 includes nodes 616-618, and the output layer 606 includes a node 622. In this example, each node in a layer is connected to every node in an adjacent layer. For example, the node 608 in the input layer 602 is connected to both of the nodes 616-618 in the hidden layer 604. Similarly, the node 616 in the hidden layer is connected to all of the nodes 608-614 in the input layer 602 and the node 622 in the output layer 606. Although only one hidden layer is shown for the artificial neural network 600, it has been contemplated that the artificial neural network 600 used by the line application controller 304 may include as many hidden layers as necessary. As discussed above, the unsupervised neural network may be provided as the input layer 602 and multiple hidden layers while the supervised neural network may be provided as multiple hidden layers and the output layer 606.

In this example, the artificial neural network 600 receives a set of input values and produces an output value. Each node in the input layer 602 may correspond to a distinct input value (e.g., a model parameter). For example, the node 608 may correspond to a first parameter of a model, the node 610 may correspond to a second parameter of the model, the node 612 may correspond to a third parameter of the model, and the node 614 may correspond to the deviation computed for the model.

In some embodiments, each of the nodes 616-618 in the hidden layer 604 generates a representation, which may include a mathematical computation (or algorithm) that produces a value based on the input values received from the nodes 608-614. The mathematical computation may include assigning different weights to each of the data values received from the nodes 608-614. The nodes 616 and 618 may include different algorithms and/or different weights assigned to the data variables from the nodes 608-614 such that the nodes 616-618 may produce different values based on the same input values received from the nodes 608-614. The values generated by the nodes 616 and 618 may be used by the nodes 622 in the output layer 606 to produce an output value for the artificial neural network 600.

For example, and according to various embodiments of the present disclosure, the input values associated with the nodes 608-614 of the input layer may include the feature points of the visual information obtained of the foodstuff. The node 622 included in the output layer may include a classification (e.g., defective or satisfactory) of the foodstuff. Furthermore, the classification may further determine characteristics about the foodstuff that is defective (e.g., improper shape, presence of holes, improper size, or the like). The output layer may be used to notify an operator or a quality assurance member of the conveyor system 101. While a particular machine learning algorithm is illustrated, one of skill in the art in possession of the present disclosure will recognize, in other embodiments, one or more machine learning algorithms may be used to perform supervised machine learning, unsupervised machine learning (e.g., deep belief networks, neural networks, statistical pattern recognition, rule-based artificial intelligence, etc.) semi-supervised learning, reinforcement learning, deep learning, and other machine learning algorithms to classify visual information or other information gathered by sensors about the foodstuff to improve quality of the foodstuff and the conveyor system 101.

Thus, the systems and the methods of the present disclosure provide a foodstuff processing line system and process that introduces a conveyor system that advances the foodstuff, which in some embodiments, is a meat slab or more particularly a belly, through various stages and components of the foodstuff processing line system. The foodstuff processing line system introduces a trimmer prior to the foodstuff advancing to a cooker and, in some embodiments, prior to advancing to an injector that injects the foodstuff with a liquid solution (e.g., a brine solution). Weights of the foodstuff may be measured before and after various stages of the foodstuff processing system, which may be used to determine various controls of the various components of the foodstuff processing system for processing the foodstuff, a subsequent foodstuff, or a prior foodstuff. As such, the system and process provide less points of contact by a human, which greatly reduces contamination, waste, and downtime of the process. Furthermore, the system and process remove the need for combs and trees used in conventional belly processing, provide a more regulated and consistent finished belly, reduces production time of the belly, and other benefits that would be apparent to one of skill in the art in possession of the present disclosure.

Figure 5:
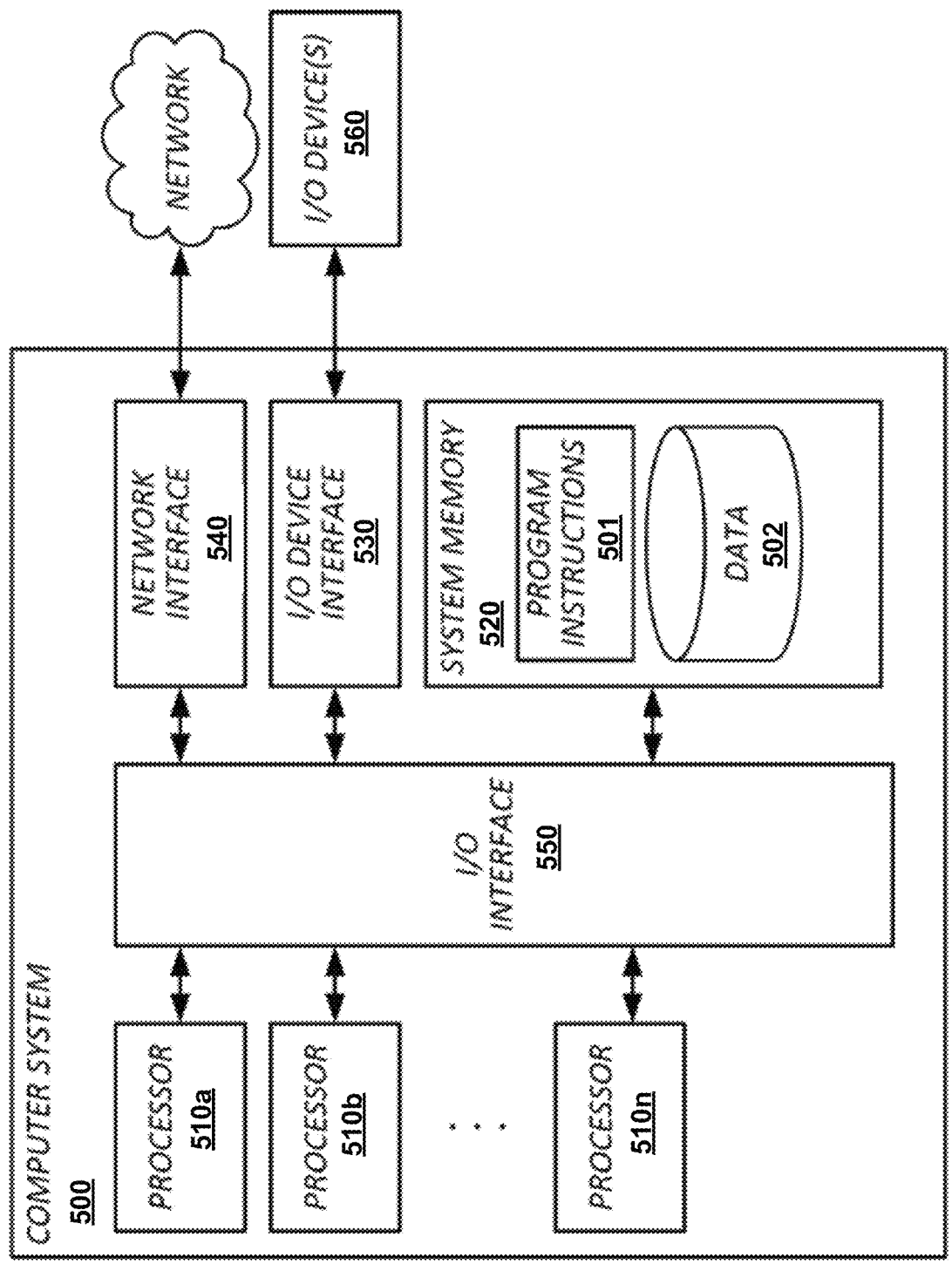
FIG. 5 illustrates an example computing device by which the present techniques may be implemented, in accordance with some embodiments of the present disclosure.

FIG. 5 is a diagram that illustrates an exemplary computing system 500 in accordance with embodiments of the present technique. Various portions of systems and methods described herein may include or be executed on one or more computer systems similar to computing system 500. For example, the client computing device 14, the server computing devices 12, the foodstuff processing line computing device 16/300 or any of the components of the foodstuff processing line system (e.g., the conveyor system 101, the dump system 102, the flattener 104, the weigh belts 106, 116, 124, or 136, the trimmer 108, the servo depositor 112, the flighted depositor 114, the injector 118, the flip system 120, the servo alignment landing conveyor 122, the smart belt servo 126, the liquid smoker 128, the cooker 130, the smoker 132, the chiller 134, the press system 138, or the stacker system 140) a may be provided by the computing system 500 Further, processes and modules described herein may be executed by one or more processing systems similar to that of computing system 500.

Computing system 500 may include one or more processors (e.g., processors 510a-510n) coupled to system memory 520, an input/output I/O device interface 530, and a network interface 540 via an input/output (I/O) interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a uni-processor system including one processor (e.g., processor 510*a*), or a multi-processor system including any number of suitable processors (e.g., 510*a*-510*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer system, for example, may be connected to computer system 500 via a network and network interface 540.

Network interface 540 may include a network adapter that provides connection of computer system 500 to a network. Network interface 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 501 or data 502. Program instructions 501 may be executable by a processor (e.g., one or more of processors 510*a*-510*n*) to implement one or more embodiments of the present techniques. Instructions 501 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 520 may include a non-transitory computer readable storage medium that may have program instructions stored thereon that are executable by a computer processor (e.g., one or more of processors 510*a*-510*n*) to cause the subject matter and the functional operations described herein. A memory (e.g., system memory 520) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 550 may be configured to coordinate I/O traffic between processors 510*a*-510*n*, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510*a*-510*n*). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 500 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all the software components may execute in memory on another device and communicate with the illustrated computer system via inter-computer communication. Some or all the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "an element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system"

performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish, or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A foodstuff processing line method, comprising: receiving, by a trimmer via a conveyor system, a foodstuff; automatically trimming, by the trimmer and based on trimming instructions, the foodstuff that results in trimmings and a trimmed foodstuff; advancing, via the conveyor system, the trimmings of the foodstuff to a trimmings collector; and advancing, via the conveyor system, the trimmed foodstuff out of the trimmer, wherein the trimmer is provided on the conveyor system prior to an injector such that the trimmer performs the automatic trimming of the foodstuff prior to injecting the foodstuff with a liquid solution by the injector.

2. The foodstuff processing line method of embodiment 1, further comprising: weighing, by a first weigh conveyor included in the conveyor system, the foodstuff to obtain an initial weight of the foodstuff prior to being received by the trimmer; and weighing, by a second weigh conveyor included in the conveyor system, the trimmed foodstuff to obtain a trimmed weight of the foodstuff after being trimmed by the trimmer.

3. The foodstuff processing line method of embodiment 2, further comprising: calculating, by a computer system, a trimming weight of the trimmings based on a difference of the initial weight and the trimmed weight; and generating, by the computer system, second trimming instructions for a second subsequent foodstuff based on at least one of the trimming weight or the trimmed weight.

4. The foodstuff processing line method of any one of embodiments 1-3, further comprising: flattening, by a flattener, the foodstuff prior the foodstuff being received by the trimmer, wherein the flattener is coupled with the trimmer via the conveyor system.

5. The foodstuff processing line method of any one of embodiments 1-4, further comprising: injecting, by the injector coupled to the conveyor system and based on injection instructions, the liquid solution into the trimmed foodstuff to generate an injected foodstuff; and advancing, by the conveyor system, the injected foodstuff out of the injector.

6. The foodstuff processing line method of embodiment 5, further comprising: weighing, by a first weigh conveyor included in the conveyor system, the trimmed foodstuff to obtain a trimmed weight of the trimmed foodstuff prior to being received by the injector; and weighing, by a second weigh conveyor included in the conveyor system, the injected foodstuff to obtain an injected weight of the injected foodstuff after being injected with the liquid solution by the injector.

7. The foodstuff processing line method of embodiment 6, further comprising: calculating, by a computer system, an injection weight of the liquid solution injected into the trimmed foodstuff based on a difference of the trimmed weight and the injected weight; and generating, by the computer system, second injection instructions for a second subsequent foodstuff based on at least one of the injection weight or the injected weight.

8. The foodstuff processing line method of embodiment 5, further comprising: receiving, by a cooker via the conveyor system, the injected foodstuff; cooking, by the cooker and based on cooking instructions, the injected foodstuff that results a cooked foodstuff; and advancing, via the conveyor system, the cooked foodstuff out of the cooker.

9. The foodstuff processing line method of embodiment 8, further comprising: receiving, by a smoker via the conveyor system, the cooked foodstuff; smoking, by the smoker and based on smoking instructions, the cooked foodstuff that results in a smoked foodstuff; and advancing, via the conveyor system, the smoked foodstuff out of the smoker.

10. The foodstuff processing line method of embodiment 9, further comprising: receiving, by a chiller via the conveyor system, the smoked foodstuff; chilling, by the chiller and based on chilling instructions, the smoked foodstuff that results in a chilled foodstuff; and advancing, via the conveyor system, the chilled foodstuff out of the chiller.

11. The foodstuff processing line method of embodiment 10, further comprising: weighing, by a first weigh conveyor included in the conveyor system, the injected foodstuff to obtain an injected weight of the injected foodstuff prior to being received by the cooker; and weighing, by a second weigh conveyor included in the conveyor system, the chilled foodstuff to obtain a finished weight of the chilled foodstuff after being chilled by the chiller.

12. The foodstuff processing line method of embodiment 11, further comprising: calculating, by a computer system, a difference in weight between the injected weight and the finished weight; and generating, by the computer system, at least one of second cooking instructions, second smoking instructions, or second chilling instructions for a second subsequent foodstuff based on at least one of the difference in weight or the finished weight.

13. The foodstuff processing line method of embodiment 10, further comprising: receiving, by a first press via the conveyor system, the chilled foodstuff; pressing, by the first press having a foodstuff mold and based on pressing instructions, the chilled foodstuff that results in a pressed foodstuff; and advancing, via the conveyor system, the pressed foodstuff out of the first press.

14. The foodstuff processing line method of embodiment 13, further comprising: receiving, by a stacker via the conveyor system, the pressed foodstuff; and automatically stacking, by the stacker and based on stacking instructions, the pressed foodstuff on a pallet.

15. The foodstuff processing line method of embodiment 13, further comprising: determining, by a computer system, that the first press is not available; activating, by the computer system, a second press; sending, by the computer system, second pressing instructions to the second press to press a subsequent chilled foodstuff and conveyor instructions to the conveyor system to advance the subsequent chilled foodstuff to the second press; advancing, by the conveyor system based on the conveyor instructions, the subsequent chilled foodstuff, to the second press; receiving, by the second press via the conveyor system, the subsequent chilled foodstuff; pressing, by the second press and based on the second pressing instructions, the subsequent chilled foodstuff that results in a subsequent pressed foodstuff; and advancing, via the conveyor system, the subsequent pressed foodstuff out of the second press.

16. The foodstuff processing line method of any one of embodiments 1-15, further comprising: receiving, by a cooker via the conveyor system, the trimmed foodstuff; cooking, by the cooker and based on cooking instructions, the trimmed foodstuff that results a cooked foodstuff; and advancing, via the conveyor system, the cooked foodstuff out of the cooker.

17. The foodstuff processing line method of any one of embodiments 1-16, further comprising: flattening, by a flattener, the foodstuff prior the foodstuff being received by the trimmer, wherein the flattener is coupled with the trimmer via the conveyor system; injecting, by the injector coupled to the conveyor system and based on injection instructions, the liquid solution into the trimmed foodstuff to generate an injected foodstuff; advancing, by the conveyor system, the injected foodstuff out of the injector: receiving, by a cooker via the conveyor system, the injected foodstuff; cooking, by the cooker and based on cooking instructions, the injected foodstuff that results a cooked foodstuff; advancing, via the conveyor system, the cooked foodstuff out of the cooker; receiving, by a smoker via the conveyor system, the cooked foodstuff; smoking, by the smoker and based on smoking instructions, the cooked foodstuff that results in a smoked foodstuff; advancing, via the conveyor system, the smoked foodstuff out of the smoker; receiving, by a chiller via the conveyor system, the smoked foodstuff; chilling, by the chiller and based on chilling instructions, the smoked foodstuff that results in a chilled foodstuff; advancing, via the conveyor system, the chilled foodstuff out of the chiller; receiving, by a press via the conveyor system, the chilled foodstuff; pressing, by the press having a foodstuff mold and based on pressing instructions, the chilled foodstuff that results in a pressed foodstuff; advancing, via the conveyor system, the pressed foodstuff out of the press; receiving, by a stacker via the conveyor system, the pressed foodstuff; and automatically stacking, by the stacker and based on stacking instructions, the pressed foodstuff on a container.

18. A foodstuff processing system comprising: a conveyor system; an injector that is coupled to the conveyor system; and a trimmer that is coupled to the conveyor system and that is configured to: receive, via the conveyor system, a foodstuff; automatically trim, based on trimming instructions, the foodstuff that results in trimmings and a trimmed foodstuff; advance, via the conveyor system, the trimmings of the foodstuff to a trimmings collector; and advance, via the conveyor system, the trimmed foodstuff out of the trimmer, wherein the trimmer is provided on the conveyor system prior to the injector such that the trimmer performs the automatic trimming of the foodstuff prior to injecting the foodstuff with a liquid solution by the injector.

19. The foodstuff processing system of embodiment 18, wherein the conveyor system includes: a first weigh conveyor that is configured to weigh the foodstuff to obtain an initial weight of the foodstuff prior to being received by the trimmer; and a second weigh conveyor that is configured to weigh the trimmed foodstuff to obtain a trimmed weight of the foodstuff after being trimmed by the trimmer, and wherein the foodstuff processing system further comprises: a computer system that includes: a non-transitory memory storing instructions; and one or more hardware processors coupled to the non-transitory memory and configured to read the instructions from the non-transitory memory to cause the computer system to perform operations comprising: calculating a trimming weight of the trimmings based on a difference of the initial weight and the trimmed weight; generating second trimming instructions for a second subsequent foodstuff based on at least one of the trimming weight or the trimmed weight; and providing the second trimming instructions to the trimmer that causes the trimmer to replace the trimming instructions with the second trimming instructions.

20. The foodstuff processing system of claim 18, wherein the injector is configured to inject, based on injection instructions, the liquid solution into the trimmed foodstuff to generate an injected foodstuff and the foodstuff processing system further comprises: a flattener that is coupled to the conveyor system that is configured to flatten, based on flattening instructions, the foodstuff prior the foodstuff being received by the trimmer; a cooker that is coupled to the conveyor system and that is configured to cook, based on cooking instructions, the injected foodstuff that results a cooked foodstuff; a smoker that is coupled to the conveyor system and that is configured to smoke, based on smoking instructions, the cooked foodstuff that results in a smoked foodstuff; a chiller that is coupled to the conveyor system and that is configured to chill, based on chilling instructions, the smoked foodstuff that results in a chilled foodstuff; a press that is coupled to the conveyor system and that is configured to press, based on pressing instructions, the chilled foodstuff that results in a pressed foodstuff; and a stacker that is coupled to the conveyor system and that is configured to stack, based on stacking instructions, the pressed foodstuff on a container.

What is claimed is:

1. A foodstuff processing line method, comprising:
changing, using a servo depositor, a foodstuff on a conveyor system from a short edge leading to a long edge leading on the conveyor system prior to being received by an injector coupled to the conveyor system;
injecting, by the injector coupled to the conveyor system and based on injection instructions, liquid solution into the foodstuff to generate an injected foodstuff, wherein the foodstuff is in a fat-side-down orientation during injection;
advancing, by the conveyor system, the injected foodstuff out of the injector;
receiving, by a flip system coupled to an output of the injector via the conveyor system, the injected foodstuff;
flipping, by the flip system, the injected foodstuff from the fat-side-down orientation to a fat-side-up orientation;
advancing, by the conveyor system, the injected foodstuff in the fat-side-up orientation out of the flip system;
receiving, by a cooker via the conveyor system, the injected foodstuff in the fat-side-up orientation;
cooking, by the cooker and based on cooking instructions, the injected foodstuff that results in a cooked foodstuff, wherein the cooker is spirally configured such that a belt that is included in the cooker and that is coupled to the conveyor system rotates, raises, and lowers the injected foodstuff while the injected foodstuff is being cooked by the cooker; and
advancing, via the conveyor system, the cooked foodstuff out of the cooker.

2. The foodstuff processing line method of claim 1, further comprising:
flattening, by a flattener, the foodstuff prior the foodstuff being received by the injector, wherein the flattener is coupled with the injector via the conveyor system.

3. The foodstuff processing line method of claim 1, further comprising:
weighing, by a first weigh conveyor included in the conveyor system, the foodstuff to obtain a weight of the foodstuff prior to being received by the injector; and
weighing, by a second weigh conveyor included in the conveyor system, the injected foodstuff to obtain an injected weight of the injected foodstuff after being injected with the liquid solution by the injector.

4. The foodstuff processing line method of claim 3, further comprising:
calculating, by a computer system, an injection weight of the liquid solution injected into the foodstuff based on a difference of the weight and the injected weight; and
generating, by the computer system, second injection instructions for a second subsequent foodstuff based on at least one of the injection weight or the injected weight.

5. The foodstuff processing line method of claim 1, further comprising:
receiving, by a smoker via the conveyor system, the cooked foodstuff;
smoking, by the smoker and based on smoking instructions, the cooked foodstuff that results in a smoked foodstuff, wherein the smoker is spirally configured such that a belt that is included in the smoker and that is coupled to the conveyor system rotates, raises, and lowers the cooked foodstuff while the cooked foodstuff is being smoked by the smoker; and
advancing, via the conveyor system, the smoked foodstuff out of the smoker.

6. The foodstuff processing line method of claim 5, further comprising:
receiving, by a chiller via the conveyor system, the smoked foodstuff;
chilling, by the chiller and based on chilling instructions, the smoked foodstuff that results in a chilled foodstuff, wherein the chiller is spirally configured such that a belt that is included in the chiller and that is coupled to the conveyor system rotates, raises, and lowers the smoked foodstuff while the smoked foodstuff is being chilled by the chiller; and
advancing, via the conveyor system, the chilled foodstuff out of the chiller.

7. The foodstuff processing line method of claim 6, further comprising:
weighing, by a first weigh conveyor included in the conveyor system, the injected foodstuff to obtain an injected weight of the injected foodstuff prior to being received by the cooker; and
weighing, by a second weigh conveyor included in the conveyor system, the chilled foodstuff to obtain a chilled weight of the chilled foodstuff after being chilled by the chiller.

8. The foodstuff processing line method of claim 7, further comprising:
- calculating, by a computer system, a difference in weight between the weight and the chilled weight; and
- generating, by the computer system, at least one of second cooking instructions, second smoking instructions, or second chilling instructions for a second subsequent foodstuff based on at least one of the difference in weight or the chilled weight.

9. The foodstuff processing line method of claim 6, further comprising:
- receiving, by a first press via the conveyor system, the chilled foodstuff;
- pressing, by the first press having a foodstuff mold and based on pressing instructions, the chilled foodstuff that results in a pressed foodstuff; and
- advancing, via the conveyor system, the pressed foodstuff out of the first press.

10. The foodstuff processing line method of claim 9, further comprising:
- receiving, by a stacker via the conveyor system, the pressed foodstuff; and
- automatically stacking, by the stacker and based on stacking instructions, the pressed foodstuff on a pallet.

11. The foodstuff processing line method of claim 9, further comprising:
- determining, by a computer system, that the first press is not available;
- activating, by the computer system, a second press;
- sending, by the computer system, second pressing instructions to the second press to press a subsequent chilled foodstuff and conveyor instructions to the conveyor system to advance the subsequent chilled foodstuff to the second press;
- advancing, by the conveyor system based on the conveyor instructions, the subsequent chilled foodstuff, to the second press,
- receiving, by the second press via the conveyor system, the subsequent chilled foodstuff;
- pressing, by the second press and based on the second pressing instructions, the subsequent chilled foodstuff that results in a subsequent pressed foodstuff; and
- advancing, via the conveyor system, the subsequent pressed foodstuff out of the second press.

12. The foodstuff processing line method of claim 1, further comprising:
- flattening, by a flattener, the foodstuff prior the foodstuff being received by the injector, wherein the flattener is coupled with the injector via the conveyor system;
- receiving, by a smoker via the conveyor system, the cooked foodstuff;
- smoking, by the smoker and based on smoking instructions, the cooked foodstuff that results in a smoked foodstuff, wherein the smoker is spirally configured such that a belt that is included in the smoker and that is coupled to the conveyor system rotates, raises, and lowers the cooked foodstuff while the cooked foodstuff is being smoked by the smoker;
- advancing, via the conveyor system, the smoked foodstuff out of the smoker;
- receiving, by a chiller via the conveyor system, the smoked foodstuff;
- chilling, by the chiller and based on chilling instructions, the smoked foodstuff that results in a chilled foodstuff, wherein the chiller is spirally configured such that a belt that is included in the chiller and that is coupled to the conveyor system rotates, raises, and lowers the smoked foodstuff while the smoked foodstuff is being chilled by the chiller;
- advancing, via the conveyor system, the chilled foodstuff out of the chiller;
- receiving, by a press via the conveyor system, the chilled foodstuff;
- pressing, by the press having a foodstuff mold and based on pressing instructions, the chilled foodstuff that results in a pressed foodstuff;
- advancing, via the conveyor system, the pressed foodstuff out of the press;
- receiving, by a stacker via the conveyor system, the pressed foodstuff; and
- automatically stacking, by the stacker and based on stacking instructions, the pressed foodstuff on a container.

13. The foodstuff processing line method of claim 1, further comprising:
- receiving, by a trimmer via a conveyor system, the foodstuff;
- automatically trimming, by the trimmer and based on trimming instructions, the foodstuff that results in trimmings and a trimmed foodstuff;
- advancing, via the conveyor system, the trimmings of the foodstuff to a trimmings collector; and
- advancing, via the conveyor system, the trimmed foodstuff out of the trimmer, wherein the trimmer is provided on the conveyor system prior to the injector such that the trimmer performs automatic trimming of the foodstuff prior to injecting the foodstuff with the liquid solution by the injector.

14. The foodstuff processing line method of claim 13, wherein the trimmed foodstuff is short edge leading on the conveyor system when advancing out of the trimmer; and the foodstuff processing line method further comprises:
- changing, using the servo depositor, the trimmed foodstuff from the short edge leading to the long edge leading on the conveyor system subsequent the trimmer.

15. The foodstuff processing line method of claim 13, further comprising:
- weighing, by a first weigh conveyor included in the conveyor system, the foodstuff to obtain an initial weight of the foodstuff prior to being received by the trimmer; and
- weighing, by a second weigh conveyor included in the conveyor system, the trimmed foodstuff to obtain a trimmed weight of the foodstuff after being trimmed by the trimmer.

16. The foodstuff processing line method of claim 15, further comprising:
- calculating, by a computer system, a trimming weight of the trimmings based on a difference of the initial weight and the trimmed weight; and
- generating, by the computer system, second trimming instructions for a second subsequent foodstuff based on at least one of the trimming weight or the trimmed weight.

17. The foodstuff processing line method of claim 1, further comprising:
- capturing, with an imaging sensor coupled with the conveyor system prior to the injector, visual information of the foodstuff;
- providing the visual information associated with the foodstuff to a foodstuff processing line computing device;

analyzing, by an artificial intelligence engine using a foodstuff model, a quality of the foodstuff; and reporting, by the artificial intelligence engine, the quality of the foodstuff to a user.

18. A foodstuff processing system comprising:
a conveyor system;
an injector that is coupled to the conveyor system and that is configured to:
  receive, via the conveyor system, a foodstuff in a long edge leading orientation and a fat-side-down orientation;
  inject, based on injection instructions, liquid solution into the foodstuff to generate an injected foodstuff; and
  advance, via the conveyor system, the injected foodstuff out of the injector;
a flip system that is coupled to an output of the injector via the conveyor system and that is configured to:
  receive the injected foodstuff;
  flip the injected foodstuff from the fat-side-down orientation to a fat-side-up orientation; and
  advance, via the conveyor system, the injected foodstuff in the fat-side-up orientation out of the flip system; and
a cooker that is coupled to an output of the flip system via the conveyor system and that is configured to:
  receive the injected foodstuff in the fat-side-up orientation;
  cook, based on cooking instructions, the injected foodstuff that results in a cooked foodstuff, wherein the cooker is spirally configured such that a belt that is included in the cooker and that is coupled to the conveyor system rotates, raises, and lowers the injected foodstuff while the injected foodstuff is being cooked by the cooker; and
  advance, via the conveyor system, the cooked foodstuff out of the cooker.

19. The foodstuff processing system of claim 18, wherein the conveyor system includes:
  a first weigh conveyor that is configured to weigh the foodstuff to obtain an initial weight of the foodstuff prior to being received by the injector; and
  a second weigh conveyor that is configured to weigh the injected foodstuff to obtain an injected weight of the foodstuff after being injected by the injector, and wherein the foodstuff processing system further comprises:
  a computer system that includes:
    a non-transitory memory storing instructions; and
    one or more hardware processors coupled to the non-transitory memory and configured to read the instructions from the non-transitory memory to cause the computer system to perform operations comprising:
      generating second injection instructions for a second subsequent foodstuff based on the injected weight; and
      providing the second injection instructions to the injector that causes the injector to replace the injection instructions with the second injection instructions.

20. The foodstuff processing system of claim 18, further comprising:
  a flattener that is coupled to the conveyor system that is configured to flatten, based on flattening instructions, the foodstuff prior the foodstuff being received by the injector;
  a smoker that is coupled to the conveyor system and that is configured to smoke, based on smoking instructions, the cooked foodstuff that results in a smoked foodstuff, wherein the smoker is spirally configured such that a belt that is included in the smoker and that is coupled to the conveyor system rotates, raises, and lowers the cooked foodstuff while the cooked foodstuff is being smoked by the smoker;
  a chiller that is coupled to the conveyor system and that is configured to chill, based on chilling instructions, the smoked foodstuff that results in a chilled foodstuff, wherein the chiller is spirally configured such that a belt that is included in the chiller and that is coupled to the conveyor system rotates, raises, and lowers the smoked foodstuff while the smoked foodstuff is being chilled by the chiller;
  a press that is coupled to the conveyor system and that is configured to press, based on pressing instructions, the chilled foodstuff that results in a pressed foodstuff; and
  a stacker that is coupled to the conveyor system and that is configured to stack, based on stacking instructions, the pressed foodstuff on a container.

* * * * *